United States Patent Office 3,075,017
Patented Jan. 22, 1963

3,075,017
RACEMIC TETRAHYDROCARBON DIPHOSPHINE DISULFIDES
Ludwig Maier, University City, Mo., assignor to Monsanto Chemical Company, St. Louis, Mo., a corporation of Delaware
No Drawing. Filed May 13, 1960, Ser. No. 28,829
Claims priority, application Switzerland May 16, 1959
16 Claims. (Cl. 260—606.5)

The present invention relates to stereoisomeric tetrahydrocarbondiphosphine disulfides of the formula

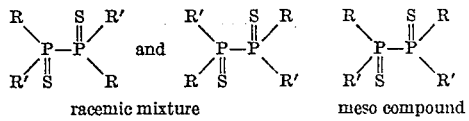

racemic mixture    meso compound and the preparation thereof, wherein R and R' are selected from the group consisting of aliphatic, araliphatic and aromatic radicals and being different from one another.

Tetrahydrocarbondiphosphine disulfides having the above mentioned formula, that is proved by the Raman spectrum and chemical reactions, are well known (Kabatschnik and Schepilewa, Nachr. Akad. Wiss. UdSSR, Abt. Chem. Wiss. 1949, page 56; Zentralblatt 1950 I, page 1345; Reinhardt, Bianchi and Mölle, Chem. Ber. 90, 1656 (1957); Christen, van der Linde and Hooge, Rec. trav. chim. 78, 161 (1959); Issleib and Tzschach, Chem. Ber. 92, 704 (1959); Kuchen and Buchwald, Angew. Chem. 71, 162 (1959).

Their preparation has been achieved by reacting thiophosphoryl halides $PSX_3$ with Grignard reagents $$AlkylMgX$$

wherein X represents chlorine, bromine or iodine. This reaction is restricted to the symmetric tetrahydrocarbondiphosphine disulfides, which have four identical organic radicals attached to both the phosphorus atoms.

It was found that tetrahydrocarbondiphosphine disulfides showing the above formula, wherein the two hydrocarbons being joined to the same phosphorus atom are different, can be obtained by reacting hydrocarbon thionophosphonyl dihalides of the formula $RP(S)X_2$ with a Grignard reagent of the formula R'MgY, wherein R and R' have the above mentioned significance and are different from one another and X stands for a halogen atom, preferably chlorine, and Y represents chlorine, bromine or iodine, preferably chlorine. In this reaction 2 moles of the hydrocarbonthionophosphonyl dihalide react with 3 moles of the Grignard to form 1 mole of the desired tetrahydrocarbondiphosphine disulfide isomers. An inert liquid reaction medium, preferably ether, will be provided at least in part in the Grignard reagent. Other inert liquid reaction mediums such as dioxan, tetrahydrofuran, tetrahydropyran, benzene, etc., can also be used.

The new compounds are mixtures of stereoisomeric forms, which, for example, differ in solubility and fusing point properties. Such forms can display particular activities in the biological process. The term biological process signifies all reactions, influences or changes involving the living matter. Thus, the new compounds can be used as active ingredients in biological toxicant compositions such as insecticides. The new compounds can be used in the state of either mixtures or conglomerates of the racemic and meso forms or isolated forms, especially the optically active antipodes, at least one form of which is especially active biologically. The new compounds of the invention are also useful as oil additives, especially for anti-wear purposes.

The number of new compounds according to the invention is large, since the hydrocarbons also can contain unsaturated aliphatic hydrocarbon radicals and/or be interrupted by heteroatoms, like S, O and N. Furthermore, the hydrocarbons can bear other substituents.

The products resulting from the transformation of the described compound will be explained in detail below.

The reduction of tetrahydrocarbondiphosphine disulfides results in the dihydrocarbondiphosphines of the formula RR'P—PR'R, wherein R and R' still have the above cited significance. The reduction can be effected by heating with, for example, zinc powder. These substituted diphosphines bearing two different hydrocarbons on each phosphorus atom, have been unknown till now, since the starting material was not obtainable by the earlier process used.

Furthermore, it was found that disubstituted metallophosphines of the formula RR'PM, wherein M is a splitting and substituting effecting metal, especially an alkaline metal, can be prepared. For example, the compound RR'PNa can be obtained by heating a tetrahydrocarbondiphosphine of the above mentioned formula, with sodium in an inert solvent.

These new compounds make possible the preparation of trihydrocarbonphosphines of the formula RR'R''P, wherein R'' has the earlier defined significance of R and R', whereby two of the radicals at least and preferably all of the three radicals are different from one another. Such a tertiary phosphine is obtainable, for example, by reacting a dihydrocarbon sodium phosphine as described above, with an organohalide R''X in the usual manner.

The treatment of tetrahydrocarbondiphosphine disulfides and tetrahydrocarbondiphosphines prepared according to the invention, with a halogen leads to the corresponding dihydrocarbonhalophosphine sulfides of the formula RR'P(S)Y, or dihydrocarbonhalophosphines of the formula RR'PY respectively, wherein R and R' have the above mentioned significance and Y represents a halogen, preferably chlorine or bromine. The reaction proceeds almost quantitatively according ot the equation:

$$RR'P(S)-(S)PR'R+Y_2 \rightarrow 2RR'P(S)Y$$

The halogenation is preferably carried out in a chlorohydrocarbon solvent and simultaneous UV-radiation may be useful but is not necessary.

Tetrahydrocarbondiphosphine disulfides, dihydrocarbonhalophosphine sulfides or dihydrocarbonhalophosphines give by reduction in usual manner with, for example, lithium aluminumhydride $LiAlH_4$, the unsymmetrically substituted dihydrocarbonphosphines of the formula RR'PH.

The treatment of the four organophosphorus derivatives which are enumerated in the preceding section, by oxidizing agents such as concentrated nitric acid, alkaline hydrogen peroxide, organic peroxides, mercuric oxide, etc. results in the formation of the corresponding dihydrocarbon phosphinic acids of the formula RR'P(O)OH.

Compared with the analogous organophosphorus compounds that are well known up till now, all of the new compounds are characterized in that the two or three hydrocarbons attached to a common phosphorus atom are different from one another.

There follows a listing of suitable hydrocarbonthionophosphonyl dihalide reactants of the invention which is meant only to be illustrative of suitable reactants useable in the method of the invention and not limiting thereof. Especially useful are these reactants wherein the hydrocarbon group contains not more than 9 carbon atoms and particularly the saturated aliphatic straight chain hydrocarbon radicals. The listing is as follows:

methylthionophosphonyl dichloride,
ethylthionophosphonyl dibromide,
n-propylthionophosphonyl diiodide, isopropylthionophosphonyl dibromide,
n-butylthionophosphonyl dichloride,
t-butylthionophosphonyl diiodide,
isobutylthionophosphonyl dibromide,
n-hexylthionophosphonyl dichloride,
n-heptylthionophosphonyl diiodide,
n-nonylthionophosphonyl dibromide,
n-vinylthionophosphonyl dibromide,
n-allylthionophosphonyl dichloride,
butenylthionophosphonyl dibromide,
isobutenylthionophosphonyl diiodide,
ethynylthionophosphonyl dibromide,
2-propynylthionophosphonyl dichloride,
2-pentynylthionophosphonyl dibromide;
phenylthionophosphonyl dibromide,
o-tolylthionophosphonyl dichloride,
p-tolylthionophosphonyl diiodide,
m-tolylthionophosphonyl dibromide,
2,3-xylylthionophosphonyl dibromide,
2,3,5-methylphenylthionophosphonyl dichloride,
2-methyl-4-ethylphenylthionophosphonyl dibromide,
4-propylphenylthionophosphonyl diiodide;
benzylthionophosphonyl dibromide,
2,3-mesitylthionophosphonyl dichloride,
4-methylbenzylthionophosphonyl diiodide,
3-ethylbenzylthionophosphonyl dibromide,
methylthionophosphonyl difluoride,
ethylthionophosphonyl chlorofluoride, etc.

The following is a non-limiting listing of the Grignard reactants useable in the process of the invention. Normally ether is the solvent used in making up Grignard reagents. For the Grignard reagent especially preferred are those compounds wherein the hydrocarbon group is limited to about 9 carbon atoms and especially preferred among the aliphatic substituents are the straight chain saturated aliphatic radicals. The listing is as follows:

methylmagnesiumbromide,
methylmagnesiumchloride,
ethylmagnesiumbromide,
n-propylmagnesiumiodide,
isopropylmagnesiumbromide,
n-butylmagnesiumchloride,
t-butylmagnesiumiodide,
isobutylmagnesiumbromide,
n-hexylmagnesiumchloride,
n-heptylmagnesiumiodide,
n-nonylmagnesiumbromide,
n-vinylmagnesiumbromide,
n-allylmagnesiumchloride,
n-2-butenylmagnesiumbromide,
isobutenylmagnesiumiodide,
ethynylmagnesiumbromide,
2-propynylmagnesiumchloride,
2-pentynylmagnesiumbromide;
phenylmagnesiumbromide,
o-tolylmagnesiumchloride,
p-tolylmagnesiumiodide,
m-tolylmagnesiumbromide,
2,3-xylylmagnesiumbromide,
2,3,5-methylphenylmagnesiumchloride,
2-methyl-4-ethylphenylmagnesiumbromide,
4-propylphenylmagnesiumiodide;
benzylmagnesiumbromide,
2,3-mesitylmagnesiumchloride,
4-methylbenzylmagnesiumiodide,
3-ethylbenzylmagnesiumbromide, etc.

The following is a listing of the stereoisomeric tetrahydrocarbondiphosphine disulfide products of the invention which listing is merely meant to be illustrative and non-limiting of the invention. The listing includes products made with various combinations of the specifically named reactants, as follows:

bis-(methyl-vinylphosphinesulfide),
bis-(ethyl-allylphosphinesulfide),
bis-(n-propyl-isobutylphosphinesulfide),
bis-(methyl-t-butylphosphinesulfide),
bis-(ethyl-2-propynylphosphinesulfide),
bis-(ethyl-n-nonylphosphinesulfide);
bis-(methyl-o-tolylphosphinesulfide),
bis-(ethyl-2,3-xylylphosphinesulfide),
bis-(methyl-o-benzylphosphinesulfide),
bis-(isopropyl-2,4-mesitylphosphinesulfide),
bis-(phenyl-p-tolylphosphinesulfide),
bis-(phenylbenzylphosphinesulfide),
bis-(benzyl-2,3-mesitylphosphinesulfide), etc.

The above examples are merely illustrative of products that can be produced by the method of the invention supplementary to the experimental examples which will be described in detail below.

EXAMPLE 1

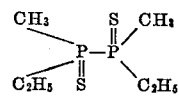

and

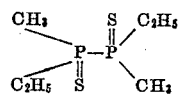

To 0.336 mole of ethylmagnesiumbromide in 100 ml. of ether is added gradually over a period of 3 hours at 22° 0.21 mole of methylthionophosphonyl dibromide. After the adidtion the reaction mixture is refluxed for 1 hour and then hydrolyzed with 50 ml. of 10% sulfuric acid. The precipitate is filtered off and washed with 500 ml. of ether.

(I) The washing ether and the filtrate are combined and the greatest part of the ether is distilled off. The separated crystals are removed by suction and dried in vacuo. Yield 8.5 g.; M.P. 100–101° C. After recrystallization from acetone-water, 7.5 g. of white leaflets are obtained; M.P. 103–104° C.

(II) To the precipitate that is obtained above is added water, the insoluble residue is filtered off and washed several times with water. After drying 8.5 g. of a white substance are obtained; M.P. 155–157° C. Recrystallization from ethanol gives 6 g. of a white crystalline substance; M.P. 159–160° C.

*Analysis.*—C$_6$H$_{16}$P$_2$S$_2$. Calcd.: C 33.63%; H 7.53%. Found: C 33.27%; H 7.27%.

*Analysis II.* — C$_6$H$_{16}$P$_2$S$_2$. Calcd.: C 33.63%; H 7.53%. Found: C 33.15%; H 7.45%.

Using a procedure similar to that of the preceding example, the following tetrahydrocarbondiphosphine disulfides which are all optically inactive have been synthesized:

Table I

| R | R′ | Form I, M.P., °C. | Form II, M.P., °C. | Overall yield, percent |
|---|---|---|---|---|
| CH$_3$ | C$_3$H$_7$ | 92– 94 | 155–156 | 53.2 |
| CH$_3$ | C$_6$H$_5$CH$_2$ | 120–123 | 183–184 | |
| CH$_3$ | C$_6$H$_5$ | 145–146 | 206–208 | 50.8 |
| CH$_3$ | nC$_4$H$_9$ | 47– 50 | 126–128 | 51.0 |

The two pure crystalline products recovered from one of the runs set forth in the table of this example were subjected to intensive examination in an attempt to determine in which stereoisomeric form each of these crystalline products existed, i.e. which was the racemate and which the meso isomer since both forms were optically inactive. The crystalline products chosen for examination were those recovered from making bis-(methyl-phenylphosphinesulfide). These crystalline products were subjected to X-ray examination and it was definitely determined that the higher melting product, i.e. the product melting at 206–208° C., was the meso stereoisomeric form of this product. The lower melting isomer, i.e. the one melting at 145–146° C. was the racemate form of the material, i.e. a mixture of optical antipodes. These optically active antipodes can be separated by known techniques.

In Table II below is shown the analytical results from elemental analysis of the crystalline products of Example 1 and Table I wherein R is methyl and R' is as shown:

Table II

| R' | Carbon | | | Hydrogen | | | Sulfur | | |
|---|---|---|---|---|---|---|---|---|---|
|  | Form I | | Form II | Form I | | Form II | Form I | | Form II |
|  | Calc. | Found | Found | Calc. | Found | Found | Calc. | Found | Found |
| C₂H₅ | 33.63 | 33.27 | 33.63 | 7.53 | 7.27 | 7.45 | 29.92 | 30.10 | |
| C₃H₇ | 39.65 | 39.10 | 38.75 | 8.32 | 7.80 | 7.85 | 26.46 | 26.55 | 26.48 |
| C₄H₉ | 44.42 | 44.36 | 43.25 | 8.95 | 8.63 | 8.42 | 23.71 | 23.03 | 23.54 |
| C₆H₅ | 54.18 | 54.26 | 54.24 | 5.19 | 5.10 | 5.13 | 20.66 | 20.51 | 20.73 |
| C₆H₅CH₂ | 56.78 | 57.88 | 56.57 | 5.96 | 6.13 | 5.92 | 18.95 | 17.32 | 18.83 |

EXAMPLE 2

8 g. of bis-(methyl-ethylphosphinesulfide)

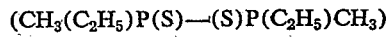
(CH₃(C₂H₅)P(S)—(S)P(C₂H₅)CH₃)

Form II of Example 1, and 26 g. of zinc dust are thoroughly mixed together and heated in a nitrogen atmosphere, with stirring, to 320°. The reaction product is collected in a trap, cooled with liquid air which is connected to a high vacuum system.

After 8 hours a yield of 2.9 g. (52% of theory) is obtained. Bis-(methyl-ethylphosphine), fractionated in high vacuum, has a boiling point of 184–190° C./716 mm. The compound inflames on exposure to air.

Analogous products were prepared in the same manner. Results of these experiments are summarized in the following table:

Table
R(CH₃)P—P(CH₃)R

| R | Boiling point | Yield, percent |
|---|---|---|
| C₃H₇ | 95°/0.18 mm | 20 |
| C₄H₉ | 51–52°/10⁻³ mm | 65 |

EXAMPLE 3

A solution of 2.3 g. bromine in 20 ml. carbon tetrachloride is added slowly to a suspension of 3 g. bis-(methyl-ethylphosphinesulfide) in 20 ml. carbon tetrachloride. An exothermic reaction takes place. The reaction mixture is then heated 1 hour under reflux, and the solution is fractionated.

A yield of 4.2 g. (80% of theory) of methylethylthionophosphonylbromide, boiling point 92–94°/10 mm., n_D²⁰ 1.5798 is obtained.

Analogous products obtained in the same manner and the data are summarized in the following table:

Table
R(CH₃)P(S)Br

| R | Boiling point | Yield, percent | n_D²⁰ |
|---|---|---|---|
| C₃H₇ | 107–110°/10 mm | 94 | 1.5639 |
| C₄H₉ | 118–122°/10 mm | 84 | 1.5541 |
| C₆H₅ | 100–110°/3.10⁻³ mm | 66 | 1.6501 |
| C₆H₅CH₂ | 150–160°/0.05 mm.¹ | 68 | |

¹ Melting point 48–50 °C.

In yet another experiment bis-(methylphenylphosphinesulfide) was cleaved using chlorine and carbon tetrachloride solvent to give an 87.3% yield of methylphenylthionophosphonylchloride, boiling point 86–98°/0.05 mm.

EXAMPLE 4

0.6 g. of sulfuryl chloride dissolved in 5 ml. benzene were added to 1 g. of bis(methyl-ethyl phosphinesulfide) dissolved in 5 ml. of benzene. Exothermic reaction accompanied by evolution of sulfur dioxide took place. A clear yellow solution was obtained. Benzene was distilled off and the residue was distilled in vacuum. A yield of 1 g. (75.3%) methyl-ethyl thiophosphinic chloride B.P. 89–93° C./10 mm. n_D²⁰ 1.5381 was obtained.

| | | Calculated | Found |
|---|---|---|---|
| Analysis C₃H₈PSCl | C | 25.27 | 25.33 |
| | H | 5.66 | 5.72 |
| | Cl | 24.87 | 24.88 |
| | S | 22.48 | 22.79 |

Analogous products obtained in the same manner and their data are compiled in the following table:

Table
R(CH₃)P(S)Cl

| R | Boiling point | Yield, percent | n_D²⁰ |
|---|---|---|---|
| C₃H₇ | 105–108°/10 mm | 31 | 1.5167 |
| C₄H₉ | 110–112°/10 mm | 39.7 | 1.5131 |
| C₆H₅ | 86–89°/0.05 mm | 88.5 | 1.6131 |

EXAMPLE 5

6.9 g. bromine dissolved in 20 ml. of benzene were added to 6.5 g. bis(methyl-ethylphosphine) dissolved in 50 ml. of benzene under ice-cooling. An exothermic reaction ensued. After distillation of benzene, the residue was fractionated. A yield of 8.1 g. methylethylphosphinebromide (60.4% of theory) B.P. 127–128°/716 mm., a clear colorless liquid, was obtained.

EXAMPLE 6

A mixture of 2 g. bis-(methyl-phenylphosphinesulfide) in 50 ml. ether and 1 g. LiAlH₄ was warmed 2 hours under reflux and then cautiously hydrolyzed with water.

The ether layer was separated, dried with sodium sulfate, and fractionated. A yield of 1 g. (62.5% of theory) methylphenylphosphine, CH₃(C₆H₅)PH, B.P. 55–56°/10 mm. was obtained.

Analogous products obtained in the same manner and their data are compiled in the following table:

Table
CH₃RPH

| R | Boiling point | Melting point, °C. | Yield, percent |
|---|---|---|---|
| C₂H₅ | 38.5°/720 mm | −160 | 43.5 |
| C₃H₇ | 84–85°/721 mm | −129.5 | 62.5 |
| C₄H₉ | 108–110°/715 mm | −107 | 78.5 |

EXAMPLE 7

A calculated amount of triphenylphosphine was added to 8 g. of bis-(methyl-ethylthionophosphine), and the mixture was heated in a nitrogen atmosphere at 150–200°. The following reaction occurred:

$$2(C_6H_5)_3P + (CH_3RPS)_2 \rightarrow 2(C_6H_5)_3PS + (CH_3RP)_2$$

After fractionation 5.35 g. (96% of theory) of bis-(methyl-ethylphosphine), B.P. 184–190° C./716 mm. was obtained.

Yet another experiment was run using tributylphosphine as the reducing agent at temperatures of 184 to 190° C. resulting in an 85.6% yield of bis-(methyl-ethylphosphine). Thus it is seen that tertiary phosphines are preferable to zinc as reducing agents for this reaction.

EXAMPLE 8

10 g. of bis-(methyl-ethylphosphinesulfide) and 40 g. HgO were suspended in benzene and heated 10 minutes under reflux. The solution became black. The HgS precipitate was filtered off and washed with 500 ml. benzene. The filtrate combined with the wash benzene was fractionated.

Analogous products obtained in the same manner and their data are compiled in the following table:

Table

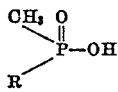

| R | Boiling point | Melting point, °C. | Yield, percent | $n_D^{20}$ |
|---|---|---|---|---|
| $C_2H_5$ | 122°/1.5 mm | | 30 | 1.6505 |
| $C_3H_7$ | 122°/10⁻⁴ mm | | 80 | 1.4518 |
| $C_4H_9$ | 142°/10⁻⁴ mm | 36–37 | 90 | [1] 1.4439 |
| $C_6H_5$ | | 135–136 | 80 | |
| $C_6H_4CH_3$ | | 121–122 | 90 | |

[1] $n_D^{40}$.

EXAMPLE 9

This example describes the evaluation of bis-(methyl-ethylphosphinesulfide) as an insecticide.

To 10 ml. of acetone 0.1 gm. of the bis-(methyl-ethylphosphinesulfide) of Example 1, melting at 159–160° C. was added to make a 1 percent concentrate. This 1 percent concentrate is added to a 200 ml. Erlenmeyer flask and three drops of "Tween 20" (reputed to be a polyoxyalkylene derivative of sorbitan monolaurate which is a nonionic surface-active agent having emulsifying properties) are added and mixed with the sample. 100 cc. of tap water is then added to make a 0.1% preparation. The mixture is vigorously swirled for 15 seconds to completely mix the preparation. Then a 5 ml. sample of this 0.1% emulsion or suspension is transferred to a 25 x 200 mm. culture tube placed in a holding block. To this culture tube is added 50 ml. of tap water to give an active concentration of the chemical of 0.01%. One long-cut stem of Woods Prolific lima bean is inserted in the culture tube containing the chemical preparation. The tube containing the bean stem is set in the greenhouse and immediately infested with two-spotted spider mites (*Tetranychus telarius*). After 48 hours the mortality observations were made. It was found that 100% of the mobile stage of the spider mites were dead in the culture tube containing the bis-(methyl-ethylphosphinesulfide).

In other testing contact insecticidal activity was demonstrated on all stages (mobile, resting, eggs) and residual activity was also demonstrated using the same phosphine-sulfide described in the previous paragraph.

In a similar manner to that described in the second paragraph above the lower melting stereoisomer, i.e. the bis-(methyl-ethylphosphinesulfide), M.P. 103–104° C., was tested for miticidal activity and found to give a 70% kill of the mobile stages of the mites.

The present stereoisomeric tetrahydrocarbondiphosphine disulfides of the invention are advantageously applied for insecticidal use in the form of sprays or dusts. Useful sprays can be prepared by dispersing the present products in water with the aid of a wetting agent or wettable powder, such as pyrophyllite, to produce sprayable aqueous dispersions. In other procedures, the products can be dissolved in an oil (whereby is meant a water-immiscible organic liquid) and then mixed with an emulsifying agent, to produce an emulsifiable concentrate which can be diluted with water to form an oil-in-water emulsion useful for application to agricultural crops as a spray. Suitable emulsifying agents for preparing the dispersions and emulsions described above are, e.g., long-chain alkylbenzenesulfonates, polyalkylene oxides, sulfates of long-chain alcohols such as octadecanol, etc.; other emulsifying agents suitable for the present purpose are described, e.g., in U.S. Department of Agriculture Bulletin E607. The present diphosphinesulfides can also be dissolved in liquefied gases such as fluorochloroethanes or methyl chloride, and applied to plants, etc., from aerosol bombs. Instead of employing liquids as carriers and diluents insecticidal dusts which contain the present stereoisomer tetrahydrocarbondiphosphine disulfides of the invention as active ingredients can be prepared, e.g., by incorporating the active diphosphinesulfides with a solid carrier such as talc, bentonite, fuller's earth, etc.

The amount of the miticidally active compounds in the compositions as applied will vary with the active ingredients, the manner of application, the species which is to be destroyed, the resistance of the crop plant sprayed, etc., and formulations and rates of applications are suitably adjusted in accordance with these factors.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, the term "hydrocarbon" has been used in its broader sense, in that reactants and products as described above can also contain interruptions in the aliphatic hydrocarbon radicals such as with hetero-atoms like S, O and N or the hydrocarbon radicals can bear other substituents. Accordingly, modifications are contemplated which can be made without departing from the spirit of the described invention.

What is claimed is:

1. A process for preparing stereoisomeric tetrahydrocarbondiphosphine disulfides of the formula

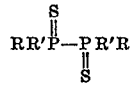

wherein R and R' are selected from the group consisting of aliphatic, aromatic and araliphatic hydrocarbon radicals having not more than 9 carbon atoms with R and R' being different, which comprises reacting a compound of the formula $RP(S)X_2$ wherein R has the same significance as above, and X is a halogen atom, with a Grignard reagent of the formula R'MgY wherein Y is selected from the class consisting of chlorine, bromine and iodine and R' has the same significance as above.

2. The process of claim 1 wherein an inert liquid reaction medium is used.

3. The process of claim 1 wherein X and Y are chlorine atoms.

4. The process of claim 3 wherein a racemic mixture and a meso isomer of the tetrahydrocarbondiphosphine disulfide are each separated in pure form from the reaction mixture.

5. The process of claim 4 wherein R and R' are straight-chain saturated aliphatic hydrocarbon radicals.

6. The process of claim 4 wherein R is a straight-chain saturated aliphatic hydrocarbon radical and R′ is an aromatic hydrocarbon radical.

7. The process of claim 4 wherein R is the methyl radical and R′ is the benzyl radical.

8. Stereoisomeric tetrahydrocarbondiphosphine disulfides of the formula

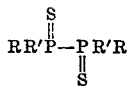

wherein R and R′ are selected from the group consisting of aliphatic, aromatic and araliphatic hydrocarbon radicals having not more than 9 carbon atoms with R and R′ being different.

9. A racemic mixture of tetrahydrocarbondiphosphine disulfides of the formula

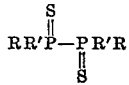

wherein R and R′ are selected from the group consisting of aliphatic, aromatic and araliphatic hydrocarbon radicals having not more than 9 carbon atoms with R and R′ being different.

10. The racemic mixture of claim 9 wherein both R and R′ are straight-chain saturated aliphatic hydrocarbon radicals.

11. The racemic mixture of claim 9 wherein R is a straight-chain saturated aliphatic hydrocarbon radical and R′ is an aromatic radical.

12. The racemic mixture of claim 9 wherein R is the methyl radical and R′ is the benzyl radical.

13. A meso isomer of a tetrahydrocarbondiphosphine disulfide of the formula

wherein R and R′ are selected from the group consisting of aliphatic, aromatic and araliphatic hydrocarbon radicals having not more than 9 carbon atoms with R and R′ being different.

14. The meso isomer of claim 13 wherein both R and R′ are straight-chain saturated aliphatic hydro-carbon radicals.

15. The meso isomer of claim 13 wherein R is a straight-chain saturated aliphatic hydrocarbon radical and R′ is an aromatic radical.

16. The meso isomer of claim 13 wherein R is the methyl radical and R′ is the benzyl radical.

References Cited in the file of this patent

Reinhardt et al.: Chem. Ber., vol. 9, pp. 656–1660 (1957).

Schlor et al.: German application 1,067,021, printed Oct. 15, 1959, 2 pages spec.

Issleib et al.: Chem. Ber., vol. 92, No. 3, pp. 704–11. (March 12, 1959), abstracted in Chem. Abs., vol. 53, pp. 13990 (Aug. 10, 1959).